United States Patent
Kyle et al.

(10) Patent No.: US 10,576,897 B2
(45) Date of Patent: Mar. 3, 2020

(54) REAR SEAT PASSENGER VANITY/REAR SEAT VANITY FOR AUTOMOBILE'S

(71) Applicants: Isaiah Kyle, Lithonia, GA (US); Jermaine Lamont Kyle, Lithonia, GA (US); Karissha Kashay Kyle, Rialto, CA (US)

(72) Inventors: Isaiah Kyle, Lithonia, GA (US); Jermaine Lamont Kyle, Lithonia, GA (US); Karissha Kashay Kyle, Rialto, CA (US)

(73) Assignees: Isaiah Kyle, Atlanta, GA (US); Jermaine Kyle, Atlanta, GA (US); Karissha Kyle, Rialto, CA (US)

( * ) Notice: Subject to any disclaimer, the term of this patent is extended or adjusted under 35 U.S.C. 154(b) by 0 days.

(21) Appl. No.: 16/232,922

(22) Filed: Dec. 26, 2018

(65) Prior Publication Data
US 2019/0270412 A1 Sep. 5, 2019

Related U.S. Application Data

(60) Provisional application No. 62/611,158, filed on Dec. 28, 2017.

(51) Int. Cl.
*B60R 1/12* (2006.01)
*B60N 2/00* (2006.01)
*B60R 11/00* (2006.01)
*B60N 2/90* (2018.01)

(52) U.S. Cl.
CPC .............. *B60R 1/1207* (2013.01); *B60N 2/00* (2013.01); *B60N 2002/905* (2018.02); *B60R 2001/1238* (2013.01); *B60R 2011/0017* (2013.01)

(58) Field of Classification Search
USPC ....................................... 248/475.1
See application file for complete search history.

(56) References Cited

U.S. PATENT DOCUMENTS

| | | | | |
|---|---|---|---|---|
| 4,681,366 A * | 7/1987 | Lobanoff | ............... | B60N 2/879 297/188.06 |
| 5,103,347 A * | 4/1992 | Lumbra | ................ | G02B 7/182 248/489 |
| 5,443,018 A * | 8/1995 | Cromwell | .............. | B60N 3/004 108/44 |
| 5,460,102 A * | 10/1995 | Pasmanick | ........... | A47B 23/002 108/25 |
| 5,878,672 A * | 3/1999 | Ostermann | ............ | B60N 3/004 108/25 |
| 5,979,337 A * | 11/1999 | Clark | ..................... | A47B 23/06 108/23 |
| 6,006,462 A * | 12/1999 | Lackomar | ............... | B60R 7/043 108/44 |
| 6,283,622 B1 * | 9/2001 | Chupp | .................... | B60R 1/008 362/492 |
| 6,857,753 B2 * | 2/2005 | Kane | ....................... | B60R 1/008 359/871 |
| 7,670,014 B2 * | 3/2010 | Parness | ................ | A63H 33/006 248/489 |
| 7,891,733 B1 * | 2/2011 | Clarke | .................... | A47C 7/62 211/118 |
| 2004/0160686 A1 * | 8/2004 | Nolan-Brown | ......... | B60R 1/008 359/871 |

* cited by examiner

*Primary Examiner* — Monica E Millner

(57) ABSTRACT

My invention is a mirror enclosed in a vinyl binder which has attached adjustable straps which hook onto front seat headrest post. Binder cover will fold down allowing passengers to view in mirror. Some models will have sliding light bulbs.

1 Claim, 3 Drawing Sheets

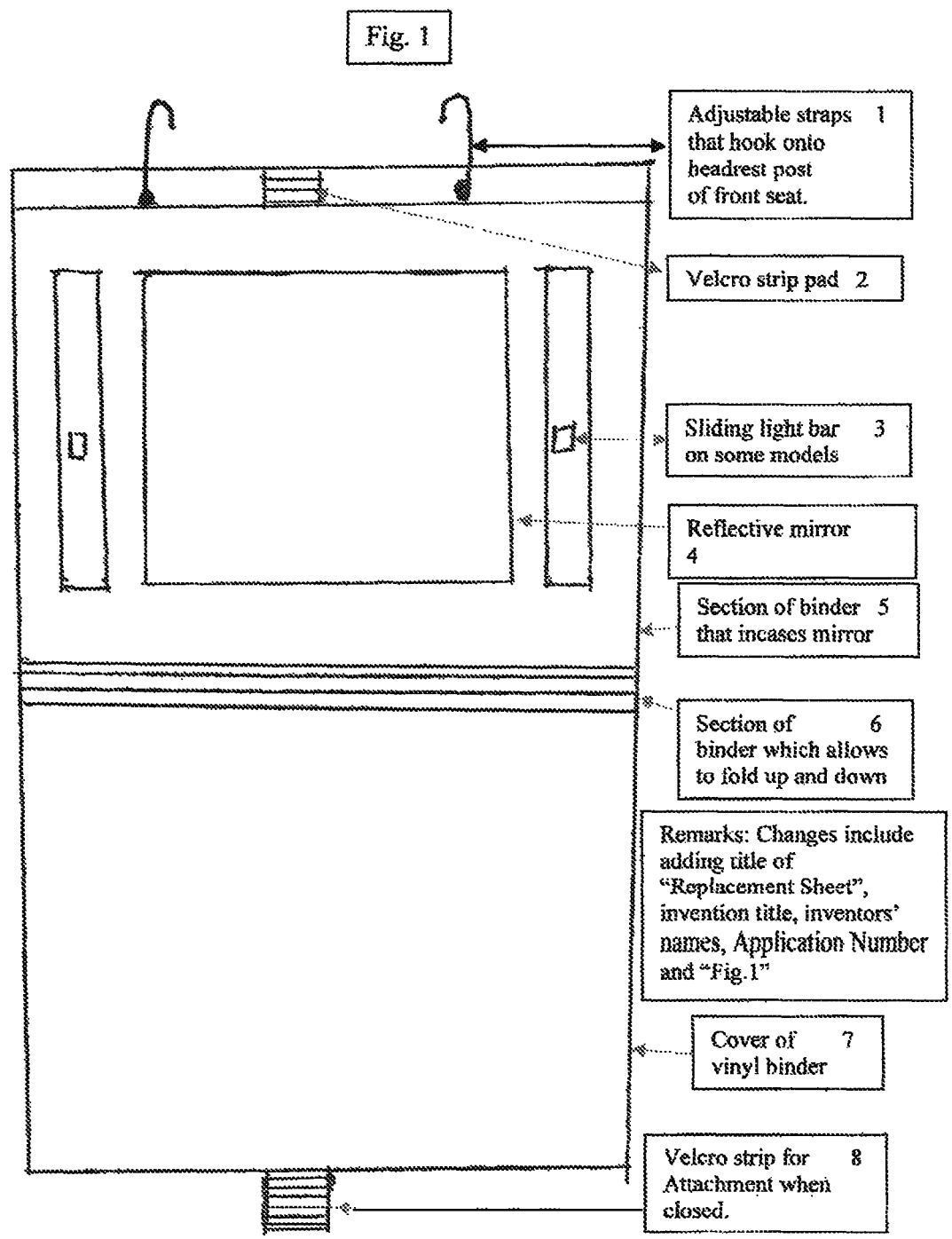

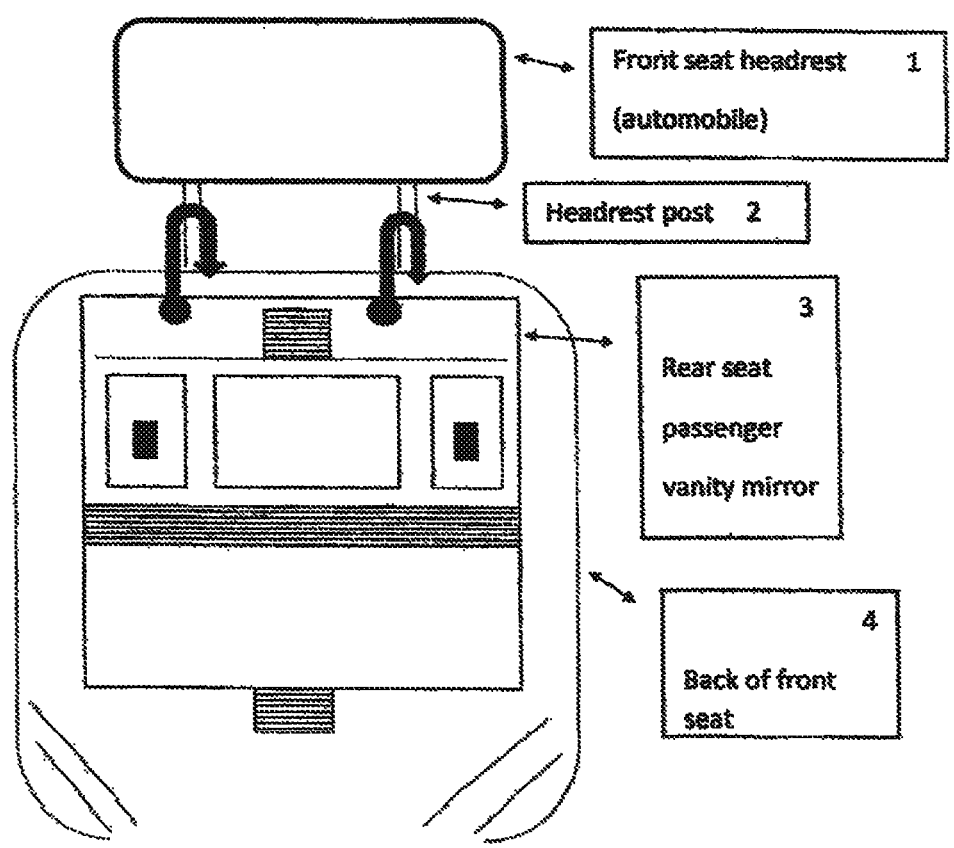

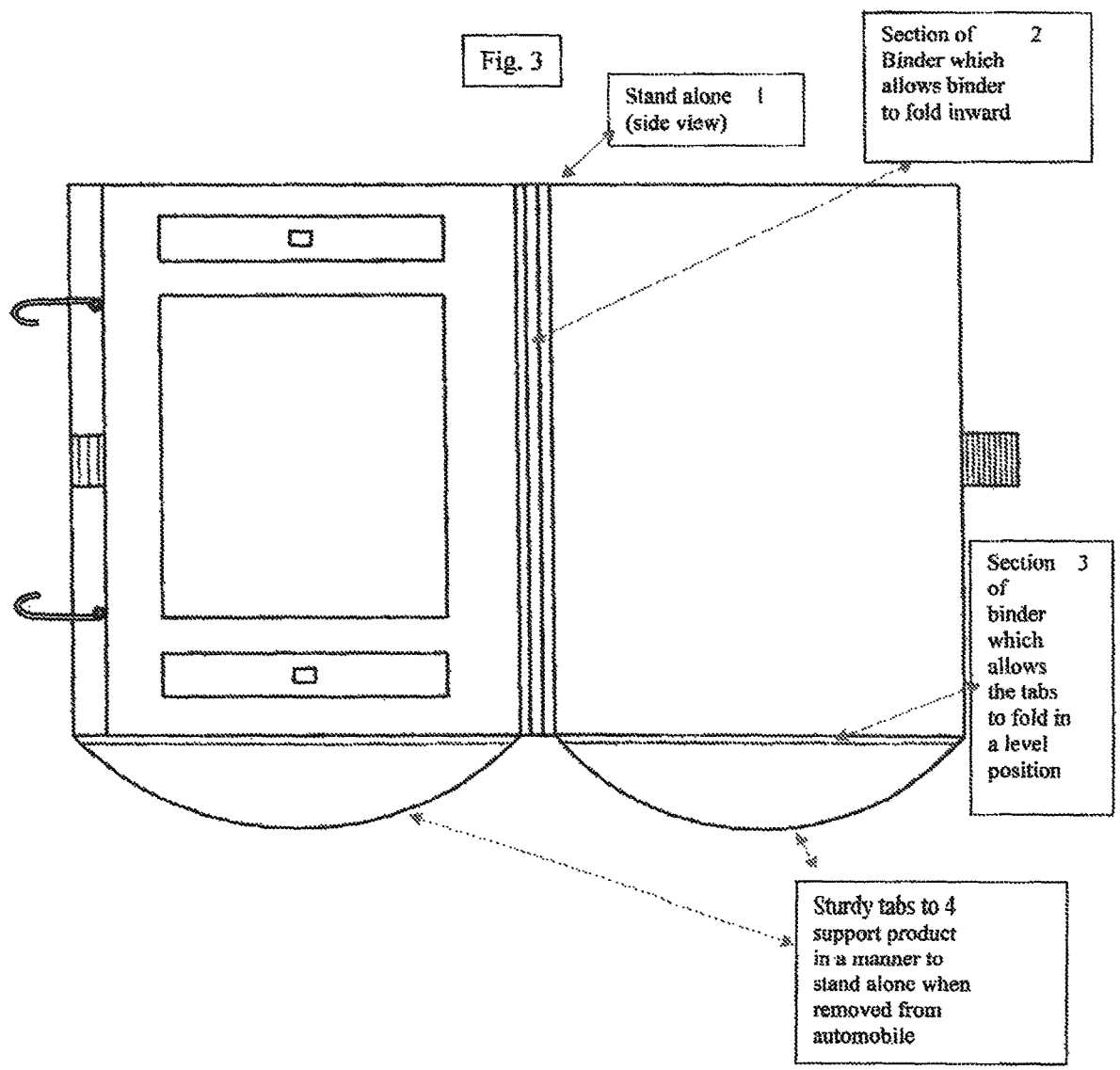

REAR SEAT PASSENGER VANITY/REAR SEAT VANITY FOR AUTOMOBILE'S

The rectangular invention will vary in size. The mirror would be enclosed in a vinyl binder with adjustable straps that hook onto the existing headrest posts of a front seat. This would suspend the product down over the back of the front seat and directly in front of a rear seat passengers.

The binder-style holder for the mirror would be designed to fold downward to open up and expose the reflective surface. The outside center edge of the cover would include a Velcro strap for quick and easy attachment when raised. Raising and securing the folding cover in this manner would conceal the mirror.

Additionally, this product could be folded in a manner to stand up alone. It could even include a sliding battery-powered light bar for lighting, providing added convenience and usefulness to the passenger.

In drawing FIG. 1, the product has adjustable straps that hook onto headrest post of front seat as shown in reference 1. A Velcro strip pad as shown in reference 2. Sliding light bar on some models as shown in reference 3. Reflective mirror as shown in reference 4. Section of the binder that incases mirror as shown in reference 5. Section of the binder which allows to fold up and down as shown in reference 6. Cover of vinyl binder as shown in reference 7. Velcro strip for attachment when closed as shown in reference 8.

In drawing FIG. 2, the product is designed to affix onto the rear of the front seat headrest (automobile) as shown in reference 1. The hooks attach onto the headrest posts, as shown in reference 2. The vanity mirror is depicted hanging for use by the rear seat passenger as shown in reference 3. The side/rear automobile view of the front seat is shown in reference 4.

In drawing FIG. 3, the stand alone side view of the product is shown in reference 1. Section of binder which allows binder to fold inward is shown in reference 2. Section of binder which allows the tabs to fold in a level position is shown in reference 3. Sturdy labs to support product in a manner to stand alone when removed from automobile is shown in reference 4.

The invention claimed is:

1. A rear seat vanity mirror configured to attach to a front seat of a headrest of a post in a vehicle and folding open for passengers riding in rear seats comprising:
    a binder having a cover and a reflective mirror, said binder configured to enclose the mirror, wherein a first section of the binder encloses the mirror and a second section of the binder allows the binder to move between an open and closed position;
    adjustable straps attached to the binder and configured to hook onto the headrest post;
    a VELCRO strip pad configured to attach when the binder is in the closed position;
    a sliding light bar;
    the second section of the binder allows the binder to fold up in the closed portion and down in the open position relative to the headrest;
    the binder is configured to suspend down a back of the front seat and directly in front of a rear seat passenger;
    sturdy tabs configured to support the binder in a stand-up position relative to a flat surface, wherein the binder is configured to be folded in a manner to stand up alone; said tabs configured to fold in a level position.

* * * * *